United States Patent [19]
Gautier et al.

[11] Patent Number: 5,791,596
[45] Date of Patent: Aug. 11, 1998

[54] PROCESS AND DEVICE FOR THE CONTROL OF THE RUDDER OF AN AIRCRAFT

[75] Inventors: Jean-Pierre Gautier, Toulouse; Jean-Marc Ortega, Blagnac, both of France

[73] Assignee: Aerospatiale Societe Nationale Industrielle, Paris Cedex, France

[21] Appl. No.: 708,698

[22] Filed: Sep. 5, 1996

[30] Foreign Application Priority Data

Sep. 15, 1995 [FR] France .................. 95 10847

[51] Int. Cl.$^6$ .................................... B64C 13/42
[52] U.S. Cl. ............... 244/76 R; 244/227; 244/235; 244/236
[58] Field of Search ............... 244/75 R, 76 R, 244/220, 221, 223, 226, 227, 229, 234, 235, 236

[56] References Cited

U.S. PATENT DOCUMENTS

| | | | |
|---|---|---|---|
| 4,759,515 | 7/1988 | Carl | 244/76 R |
| 4,762,294 | 8/1988 | Carl | 244/75 R |
| 4,765,568 | 8/1988 | Carl et al. | 244/75 R |
| 4,793,576 | 12/1988 | Frerk | 244/75 R X |
| 4,905,933 | 3/1990 | Ako | 244/75 R |

FOREIGN PATENT DOCUMENTS

| | | |
|---|---|---|
| 2 603 865 | 3/1988 | France . |
| 2 603 866 | 3/1988 | France . |
| 2 604 685 | 4/1988 | France . |

*Primary Examiner*—William Grant
*Attorney, Agent, or Firm*—Burns, Doane, Swecker & Mathis, LLP

[57] ABSTRACT

A device for controlling a rudder of an aircraft has at least two servo-systems each including at least one electric control input. At least one of the servo-systems is a mixed servo-system that also has a mechanical control input. When an engine fault occurs, an electric control system causes at least two of the servo-systems to simultaneously operate the rudder. When the electric control system is not operational due to an electric fault, the mixed servo-system operates the rudder based on control signals from the mechanical control input.

12 Claims, 6 Drawing Sheets

PROCESS AND DEVICE FOR THE CONTROL OF THE RUDDER OF AN AIRCRAFT

BACKGROUND OF THE INVENTION

1. Field of Invention

The present invention relates to a process and a device for the control of the rudder of an aircraft. More particularly, the present invention relates to an electric control device intended for use with transport aircraft, and simultaneously satisfies requirements of precision, reliability and lightness that exist for such aircraft.

2. State of the Art

FIG. 1 diagrammatically illustrates a known control device of a type presently being used to equip AIRBUS A 320 and A 340 aircraft. This device comprises an arrangement of three servo-systems 10, 12, 14 for operating a rudder 16. The three servo-systems are hydromechanical and each has a mechanical control input 18, 20, 22. The three servo systems are controlled via a linkage 24, which acts on mechanical control inputs 18, 20, 22. The linkage 24 can be actuated by rudder control pedals 26. In addition, each servo-system 10, 12, 14 is supplied by a different hydraulic circuit 28, 30, 32. The hydraulic circuits 28, 30, 32 supply the energy necessary to move the rudder 16.

The control device also incorporates a computing or calculating unit 27 that can provide control orders, instructions or commands, e.g., yaw damping commands. These commands are added to the control commands from the pedals 26 by a system of electrohydraulic jacks 36. The addition of the control commands from the computing unit to those from the pedals takes place mechanically and in such a way that the movements of the jacks 36 are not retransmitted to the pedals.

A device 40 is provided for giving an artificial sensation of force to a user via the pedals 26. The device 40 exerts a force on the pedals which is a function of the pedal deflection, thereby facilitating control. The device 40 incorporates a trim actuator 42 which is controlled by the computing unit 27. The trim actuator 42 positions the rudder 16 in a predetermined position known as the zero force position when the pilot releases the pedals 26.

Devices 44 and 46 are controlled by the computing unit 27, and serve to limit the movement of the pedals and/or the rudder.

With a control device according to FIG. 1, the three servo-systems 10, 12 and 14 are simultaneously pressurized by hydraulic circuits 28, 30, 32 respectively, and are controlled in parallel to actuate the rudder 16.

As indicated above, the electrohydraulic jacks 36 exert control commands and in particular yaw damping commands via a mechanical linkage in order to control the mechanical input of the servo-systems 10, 12 and 14. Thus, friction and any deformation of the mechanical transmission system unfavorably influences the precision of the controls.

A second known type of rudder control device makes it possible to overcome this disadvantage by using three electrical-input-equipped servo-systems. Electric control signals are directly applied to the input of the servo-systems. Thus, in the absence of a mechanical control transmission system, it is possible to operate the rudder with significantly greater precision. However, such a device has no mechanical backup in the case of an electric fault leading to the failure of all the controls.

Document FR-A-2 603 865 describes an aircraft rudder control device equipped with two electrohydraulic servo-systems having an electrical input, and a hydromechanical servo-system having a mechanical input. In this device, each servo-system is supplied by its own hydraulic circuit. The electrohydraulic servo-systems receive electric control commands supplied by computers associated therewith.

Moreover, only one of the three servo-systems is operated at a time in order to actuate the rudder. According to a predetermined hierarchy, in the case of a failure of the control system of one of the servo-systems, the control system of the next priority servo-system is activated. The control system with the hydromechanical servo-system has the lowest priority, and therefore constitutes a mechanical backup in the case of an electric failure in the other two control systems.

In the known rudder control devices, the pressurizing pumps of the hydraulic circuits that supply the servo-systems are driven or supplied with energy by the aircraft engines. For safety reasons, the pumps of the hydraulic circuits of the different servo-systems are driven by at least one aircraft engine. In general, one of the hydraulic circuits can be driven by at least two engines.

A failure or stoppage of one of the engines can lead to a pressure loss in the hydraulic circuit associated with that engine, thus rendering the corresponding servo-system inoperative.

The failure of one of the engines, particularly in the case where the aircraft has its engines fixed to the wings, can lead not only to a pressure loss in the hydraulic circuit associated therewith, but also to a thrust imbalance because the thrust provided by the engines is no longer symmetrical. This imbalance can be compensated for by actuating the rudder in an appropriate manner.

When the rudder control device has three servo-systems with an electric input or three servo-systems with a mechanical input controlled in parallel, and one of the engines fails, the rudder can be actuated using the two servo-systems not affected by the pressure drop of the hydraulic circuit associated with the faulty engine.

With a device according to Document FR-A-2 603 865, when a failure of an engine leads to a pressure drop in a hydraulic circuit of an electrohydraulic servo-system, the rudder is actuated using either the remaining operational electrohydraulic servo-system, or the hydromechanical servo-system.

However, when it is necessary to compensate for a thrust unbalance of the engines, particularly in the take-off phase, maximum stresses are exerted on the rudder. These maximum stresses determine the size of the servo-systems to be used.

The device disclosed in Document FR-A-2 603 865 is not capable of actuating the rudder using a hydromechanical servo-system and an electrohydraulic servo-system simultaneously. Accordingly, the servo-systems and associated hydraulic circuits must be dimensioned so that each servo-system is able to exert on the rudder the maximum forces or stresses necessary to compensate for an asymmetrical thrust in the case of a failure of one of the engines. This leads to an increase in the size and consequently the weight of the servo-systems and the corresponding hydraulic circuits.

Thus, one advantage of the invention is to propose an aircraft rudder control device, which has a reduced weight compared with the device of Document FR-A-2 603 865 and which is capable of actuating the rudder to compensate for an aircraft thrust unbalance caused by engine failure.

Another advantage is to propose a device that remains operational in the case of a failure of the electric servocontrol systems.

Another advantage of the invention is to propose a control device that permits actuation of the rudder with significantly greater precision compared with mechanical control-based devices.

A further advantage of the invention is to propose an improved rudder control process that satisfies severe reliability and safety requirements.

BRIEF SUMMARY OF INVENTION

The present invention more specifically relates to a device for controlling the rudder of an aircraft equipped with at least two engines. The device has at least two servo-systems, and each servo-system has at least one electric control input. An electric control system for the servo-systems is able to occupy a first state corresponding to normal operation of the engines in which at least one of the servo-systems operates the rudder. According to the invention, at least one of the servo-systems, called the mixed servo-system, also has a mechanical control input. The electric control system for the servo-systems is able to occupy a second state corresponding to an engine failure, in which at least two of the servo-systems simultaneously operate the rudder. The electric control system for the servo-systems can also occupy a third state corresponding to an electric failure, in which the mixed servo-system, controlled from the mechanical control input, operates the rudder.

As a result of the invention, the rudder can be simultaneously operated with two servo-systems, particularly in the case of an engine failure when it is necessary to apply maximum forces to the rudder to compensate for asymmetrical thrust of the engines.

The device according to the invention also offers the security of a mechanical control in the case of an electrical failure.

According to an aspect of the invention, the electric control system of the servo-systems can comprise a calculating or computing unit respectively associated with each servo-system.

Each computing unit can be equipped with one, but preferably several redundant computers. These computers develop control commands or orders, such as yaw damping commands, that are directed towards the servo-systems. Thus, the computers control the operating modes of the servo-systems as explained below.

According to another aspect of the invention, the electric-input-equipped servo-systems can each have a hydraulic jack with two chambers and a servovalve connected to a hydraulic circuit for supplying the chambers with a hydraulic fluid flow, where the fluid flow is a function of an electric control from the computing unit associated with the servo-system.

According to an aspect of the invention, the servo-systems that have an electric control input and no mechanical control can operate according to two modes.

A first mode is an "electrically active" mode. The chambers of the jack are supplied with a hydraulic fluid flow by a servovalve of the servo-system. A computer responsible for controlling the servo-system controls a solenoid valve that actuates the servovalve. The hydraulic fluid flow supplied by the servovalve to the jack chambers is a function of electric commands supplied by the computer.

A second mode is a "damped" mode. In this operating mode, the solenoid valve is deactivated by the computer that controls the servo system. The jack chambers are mutually linked across a restrictor. The restrictor brakes the passage of the hydraulic fluid from one chamber of the jack to the other and thus makes it possible to damp the movements of the rudder. It is possible to provide a damped mode with several degrees of damping. A slight damping makes it possible to only very slightly affect the performance characteristics of the operation of the rudder, in the case of normal aircraft operation. In the case of a failure, a greater damping can be provided by those servo-systems that do not actively actuate the rudder.

According to an embodiment of the invention, the device can have three servo-systems with an electric input, at least one of which is a mixed servo-system that has a mixed input. A servo-system having a mixed input can operate in a "mechanically active" mode as well as in the "electrically active" and "damped" modes. According to a first variant of the servo-system with mixed input, the latter has a first solenoid valve controlled by a first computing unit. The first solenoid valve can alternately occupy an activated state and a deactivated state. When the first solenoid valve occupies an activated state, the mixed servo-system is in an "electrically active" mode in which the chambers of the jack are linked with the servovalve. The mixed servo-system also has second and third solenoid valves respectively controlled by computing units associated with the other two servo-systems of the device. The second and third solenoid valves can alternately occupy an activated state and a deactivated state. When the first solenoid valve occupies a deactivated state and at least one of the second and third solenoid valves occupies an activated state, the chambers of the jack of the mixed servo-system are linked with one another in the "damped" operating mode. When the first, second and third solenoid valves all occupy a deactivated state, the chambers of the jack of the mixed servo-system are linked with a distributor connected to the mechanical input of the servo-system in the "mechanically active" mode.

When the jack chambers are linked with the servovalve, the latter supplies them with a hydraulic fluid flow which is a function of electric control commands generated by the electric control system and applied to the servovalve. In the same way, when the jack chambers are linked with the distributor, the latter supplies them with a hydraulic fluid flow which is a function of mechanical commands applied to the mechanical control input.

According to another embodiment of the mixed servo-system, the latter can also incorporate first, second and third solenoid valves, each respectively controlled by a computing unit associated with the mixed servo-system and by computing units associated with two other servo-systems of the device. Each solenoid valve can alternately occupy an activated state and a deactivated state. When at least one of the second and third solenoid valves is in an activated state, the jack chambers are linked and the mixed servo-system operates in the "damped" mode. When the first solenoid valve is activated and the second and third solenoid valves are deactivated, the jack chambers are linked with the servovalve, and the mixed servo-system is controlled by the electric control input and operates in the "electrically active" mode. When the first, second and third solenoid valves are in a deactivated state, the jack chambers are linked with the servo-valve, and the mixed servo-system is controlled via the mechanical control input and operates in a so-called "mechanically active" mode.

According to an aspect of the invention, each hydraulic circuit can incorporate a pressurization system driven by at least one engine.

The device can also have at least one servo-system with two electric control inputs, said servo-system having a first electric input for controlling a servovalve and a second electric input for controlling an integrated, autonomous, hydraulic generating system.

This hydraulic generating system integrated in the servo-system can supply a variable hydraulic fluid flow to the chambers of the jack, as a function of electric control commands generated by the control system, so as to operate the rudder.

Such a hydraulic generating system equips the hydrostatic servo-systems. It makes it possible to free the operation of the servo-system from that of an engine.

Thus, when a hydraulic circuit is pressurized by a pump which is driven or supplied with energy by a single engine, a failure of the engine leads to a pressure drop in the hydraulic circuit and renders the corresponding servo-system inoperative. The hydrostatic servo-systems and servo-systems having two electric inputs, one of which controls a hydraulic generating system of an autonomous nature, thus remain able to operate even in the case of an engine failure.

The invention also relates to a process for controlling actuation of the rudder of an aircraft equipped with at least two engines, comprising at least two servo-systems having an electric control input, whereof at least one, called the mixed servo-system, also has a mechanical control input, and an electric control system for the servo-systems, wherein: one of the servo-systems is electrically controlled in the case of normal operation of the engines; at least two servo-systems in an operational state are electrically and simultaneously controlled in the case of a failure of an engine; and the mixed servo-system is mechanically controlled in the case of a failure of the electric control system of the servo-systems.

Other features and advantages of the invention can be gathered from the following illustrative and non-limiting description with reference to the attached drawings.

DETAILED DESCRIPTION OF INVENTION

Figure 2:
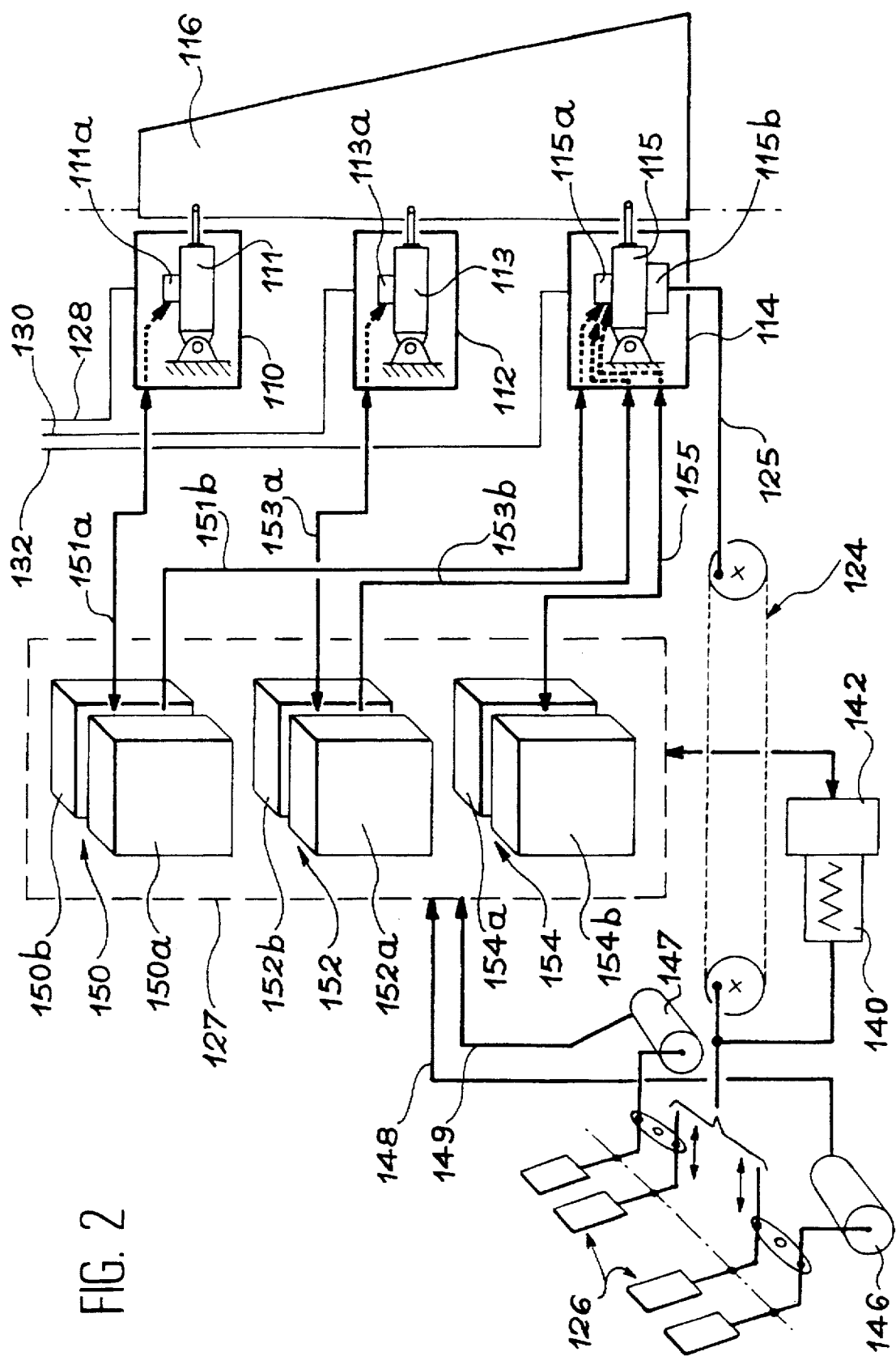
FIG. 2 is a simplified diagrammatic representation of a rudder control device according to a first embodiment of the invention. In the following description, identical or similar components in the different drawings are designated with the same references in order to facilitate the understanding thereof.

FIG. 2 shows in simplified form a first embodiment of the rudder control device, which has three servo-systems 110, 112 and 114 equipped with jacks 111, 113 and 115 for manipulating a rudder 116. The servo-systems 110 and 112 have electric control inputs 111a and 113a and the servo-system 114 is a mixed servo-system having an electric control input 115a and a mechanical control input 115b. The servo-systems are of the "single body" type, i.e. each servo-system is connected to a single hydraulic circuit and has only one jack.

The jack of each of the servo-systems is supplied by a different hydraulic circuit. The hydraulic circuits of jacks 111, 113 and 115 are partially shown and are designated with the references 128, 130 and 132.

The hydraulic circuits are equipped with pressurization pumps (not shown) respectively driven or supplied with energy by the different aircraft engines.

An electric control system 127 for the servo-systems has three computing or calculating units 150, 152 and 154 for respectively controlling the servo-systems 110, 112 and 114. Each computing unit can have a computer or a plurality of redundant computers. For example, the computing units 150, 152 and 154 can have computers 150a, 150b, 152a, 152b, 154a, 154b, respectively, as shown in FIG. 2. The redundant computers operate in parallel in order to increase the reliability of the computing units.

Figure 1:
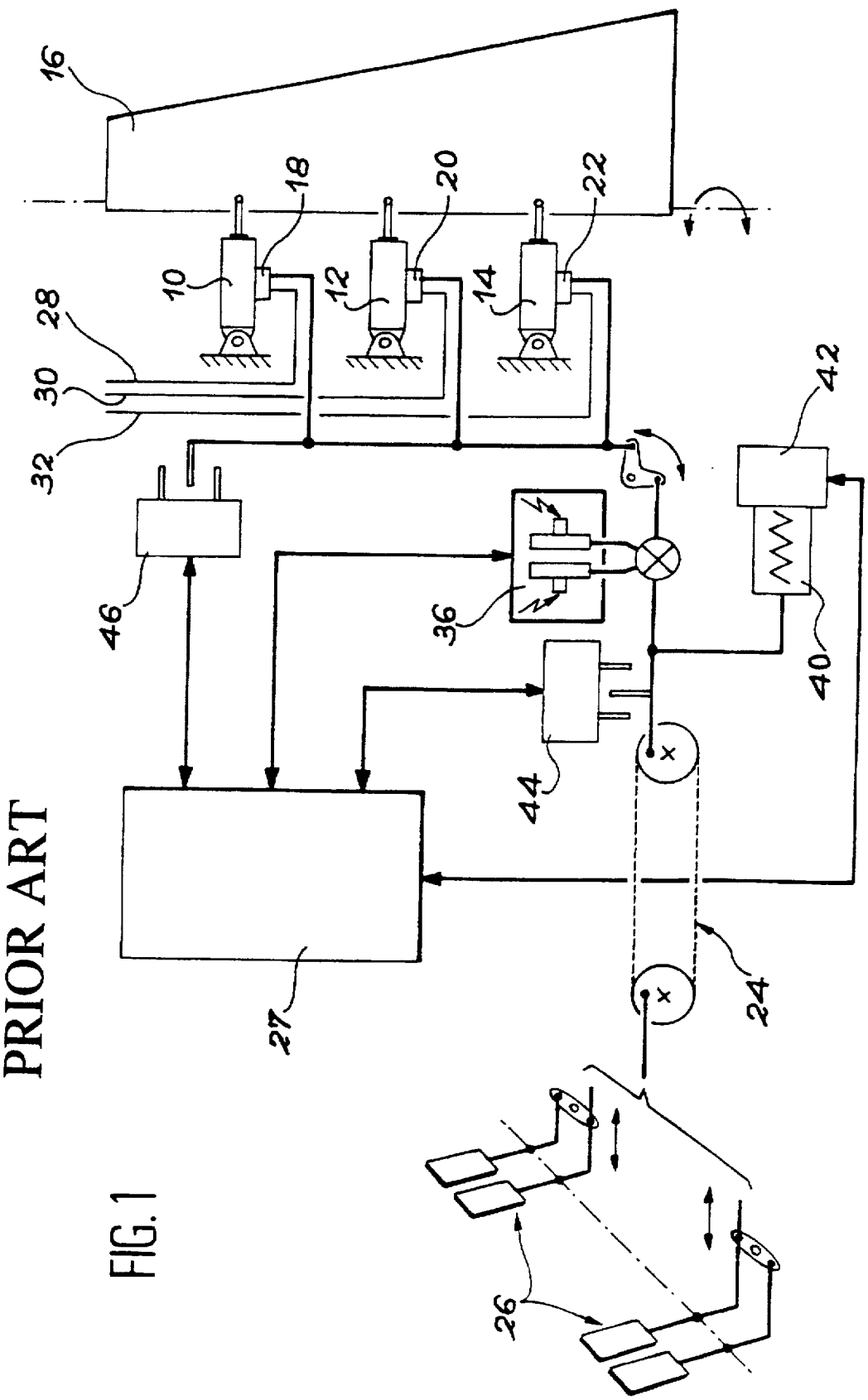
FIG. 1 is a simplified diagrammatic representation of a known aircraft rudder control device.

The computing units 150, 152 and 154 are respectively connected to the servo-systems by electrical connections 151a, 153a and 155, which are shown in simplified form in FIG. 2. The electrical connections 151a, 153a and 155 can transmit control signals to the electric control inputs 111a, 113a and 115a. These control signals integrate the orders or commands corresponding to the position of the control pedals 126 (rudder bar) on the flight deck and orders or commands such as yaw damping orders generated by the computers. Thus, the hydraulic jacks 35, which exist in the known devices as shown in FIG. 1 for introducing yaw damping control commands to the mechanical control system, are superfluous.

Electrical connections 151a, 151b, 153a, 153b and 155 transmit signals controlling an operating mode of the servo-systems.

The position of the pedals is detected by position sensors 146, 147 and electrically transmitted to the system 127 by electrical connections 148, 149.

The limitation of the movement of the rudder as a function of flight conditions can be implemented electrically in the computers. As a result of this feature, it is possible to simplify the mechanical control system by obviating mechanical movement limitation devices with respect to the pedals and/or rudder. A device for generating an artificial sensation of forces on the pedals can be installed, in this case, directly on the flight deck.

Control forces exerted on the pedals 126 by a pilot can be directly applied at the mechanical control input 115b of the servo-system 115 via a mechanical linkage system 124 together with a disengageable gear 125.

A device 140 is provided for generating an artificial sensation of forces on the pedals. A zero force regulation actuator 142 is also provided, and is controlled via the electric control system 127. The device 140 and the zero force regulation actuator 142 can restore a force to the pedals 126 that is a function of the deflection of the pedals 126.

In the case of normal operation of the engines and the system 127, the control commands are electrically transmitted to one of the servo controls. For example, the computing unit 150 supplies control commands to the servo-system 110. In the case of a failure of one of the engines, two servo-systems are simultaneously operated. When the failure of the engine leads to a hydraulic pressure drop in the hydraulic circuit of one of the servo-systems, e.g., servo-system 110, the operation of the rudder is ensured by the two servo-systems 112, 114, whose hydraulic circuit is not pressurized from the faulty engine.

According to a variant of the device of FIG. 2, one of the servo-systems 110, 112 that has an electrical input, e.g., servo-system 112, can be replaced by a hydrostatic servo-system called an electro-hydrostatic actuator or EHA. The EHA has an integrated and autonomous hydraulic generating system. The external hydraulic circuit 130 is then eliminated, which lightens the device. In the case of an engine failure leading to a pressure drop in one of the hydraulic circuits 128 or 132, one of the servo-systems 110 or 114 having an external hydraulic circuit and the autonomous servo-system 112 (EHA) remains for operating the rudder.

Figure 3:
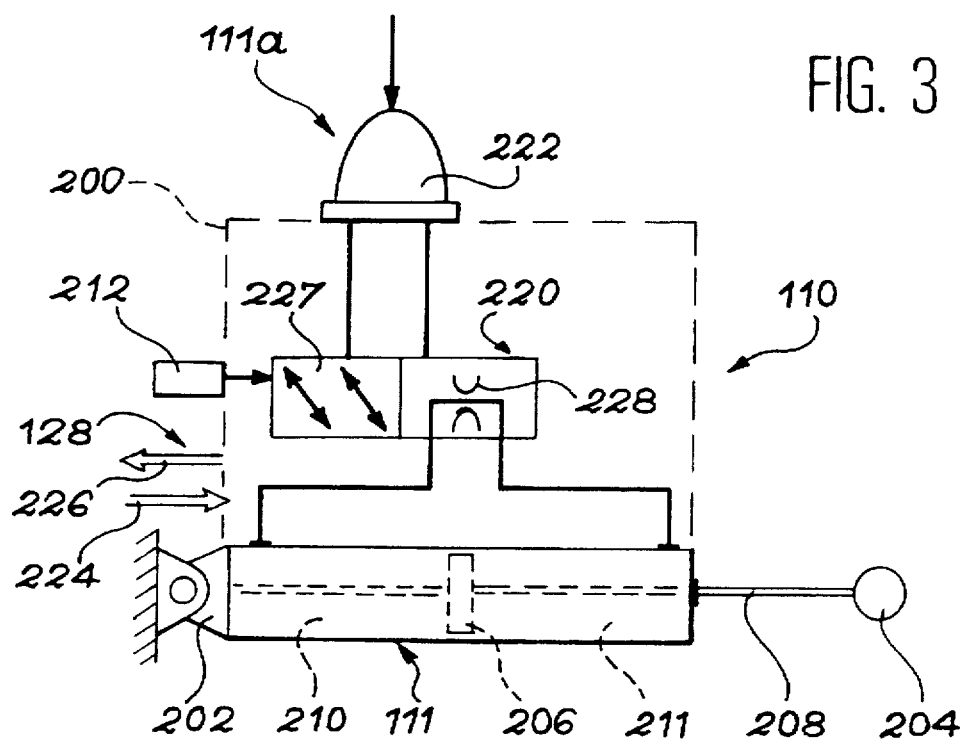
FIG. 3 is a simplified diagrammatic representation of a servo-system having an electric control input for use in the device of FIG. 2.

FIG. 3 diagrammatically shows the main components of a servo-system having an electric control input and also called the electrohydraulic servo-system. The servo-system 110 has a jack 111 and a control unit 200 with an electric control input 111a.

The jack 111 has an end 202 connected to a fixed support connected to the fin or vertical stabilizer (not shown), and an end 204 connected to the rudder 116. A piston 206, integral with a piston rod 208, subdivides the jack cylinder into two chambers 210, 211.

A solenoid valve 212 connected electrically to the computing unit (not shown) associated with the servo-system makes it possible to select a servo-system operating mode.

When the solenoid valve is activated by an electric signal, a slide or slide valve 220 known as the "mode slide" is positioned so as to link the chambers 210, 211 to a servo-valve 222, by means of a double passage portion 227 of the slide.

The servovalve 222, which is electrically connected to the computing unit, then supplies the jack 111 with a hydraulic fluid flow that is a function of the commands generated by the computing unit. The servo-system then operates in "electrically active" mode described above. The hydraulic fluid flow is supplied by a hydraulic circuit 128, of which only a high pressure inlet 224 and a low pressure outlet 226 are shown.

When the solenoid valve 212 is deactivated, in the absence of an electric signal, the mode slide valve 220 is positioned so as to isolate the chambers of the jack from the servovalve 222 and link the chambers 210, 211 together across a restrictor 228. This position, illustrated in FIG. 3, corresponds to operation of the servo-system in the "damped mode" described above.

Figure 4:
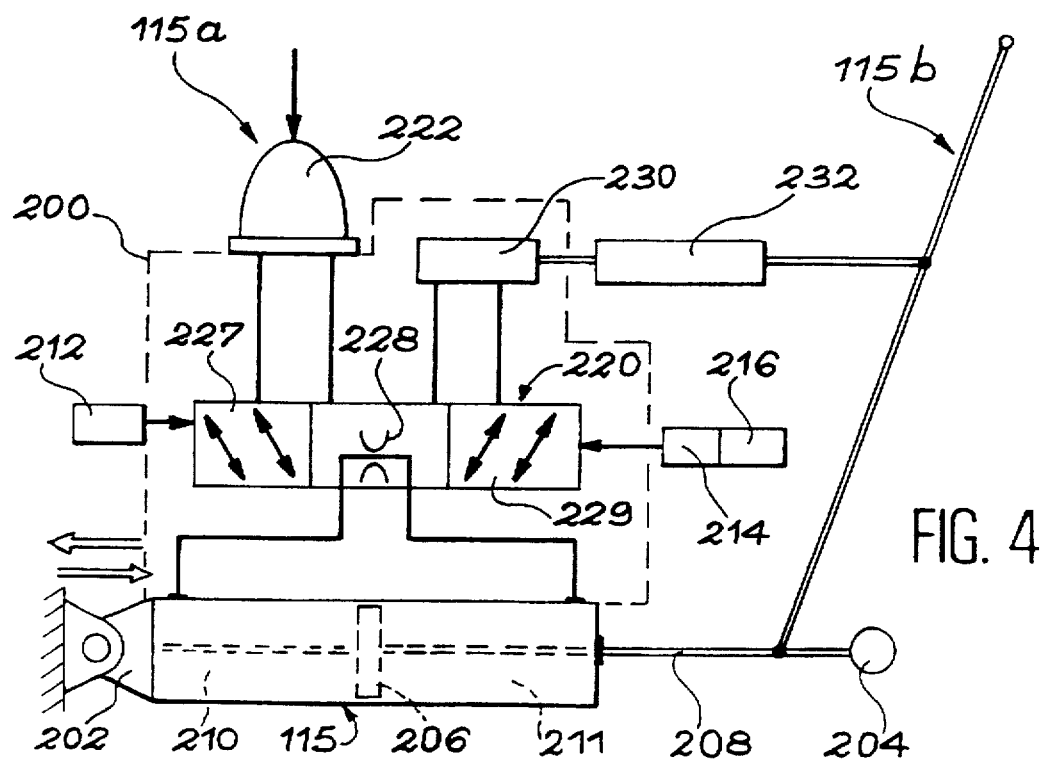
FIG. 4 is a simplified diagrammatic representation of a mixed servo-system for use in the device of FIG. 2.

FIG. 4 diagrammatically shows a mixed servo-system, like the servo-system 114 used in the control device illustrated in FIG. 2. Numerous components are identical to those of the servo-system of FIG. 3. These components are designated with the same references as those of the system of FIG. 3 and function in similar ways. In FIG. 4, the servo-system jack, by analogy with FIG. 2, is designated with the reference 115 and the electric and mechanical control inputs are respectively designated with the references 115a and 115b.

The mode slide 220 of the mixed servo-system can occupy three positions and is operated by three solenoid valves 212, 214 and 216, which are respectively controlled by the computing units 154, 152 and 150 shown in FIG. 2.

When the solenoid valve 212 is activated, the slide 220 occupies a position in which the chambers 210, 211 are linked with the servovalve 222 by means of a double passage portion 227 of the slide valve. The servo-system then operates in the "electrically active" mode described above.

When the solenoid valve 212 is deactivated and at least one of the solenoid valves 214 and 216 is activated, the mode slide occupies a position in which the chambers 210 and 211 are linked across a restrictor 228 for operation according to the damped mode. This position corresponds to the slide position shown in FIG. 4.

When none of the solenoid valves 212, 214 and 216 is activated, the mode slide occupies a third position, in which the chambers 210 and 211 are linked with a distributor 230 via a double passage portion 229 of the slide. In this position, a clutch 232 is engaged and connects the distributor 230 to the mechanical control input 115b.

The distributor 230 then supplies the jack with a hydraulic fluid flow, which is a function of the mechanical control applied to the input 115b. The servo-system operates according to the mechanically active mode. This mode is activated by default in the case of an electrical failure, i.e., when none of the solenoid valves receives a signal from a computing unit.

For example and with reference to FIG. 2, it can be seen that in the case of a failure of the first electrical chain 150, 150a, 150b, 151a, 151b associated with the servo-system 110, the solenoid valve 216 is deactivated. The second electrical chain 152, 152a, 152b, 153a, 153b associated with the servo-system 112 is then activated for controlling the servo-system 112.

In the case of an electrical failure of said second chain, the solenoid valve 214 is also deactivated. The third electrical chain 154, 154a, 154b, 155 is then activated for controlling the servo-system 114.

Finally, in the case of an electrical fault in all three chains, the three solenoid valves 212, 214 and 216 are deactivated and the mechanical control of the mixed servo-system is automatically activated.

In the case of normal operation of the rudder control device, the clutch 232 is disengaged, which avoids commands such as yaw stabilization commands supplied by the computers from being mechanically retransmitted to the pedals 26. According to a variant, to ensure that commands are not retransmitted to the pedals, it is also possible to equip the mechanical control input with a cam or spring rod system able to absorb the entire servo-system travel.

Figure 5:
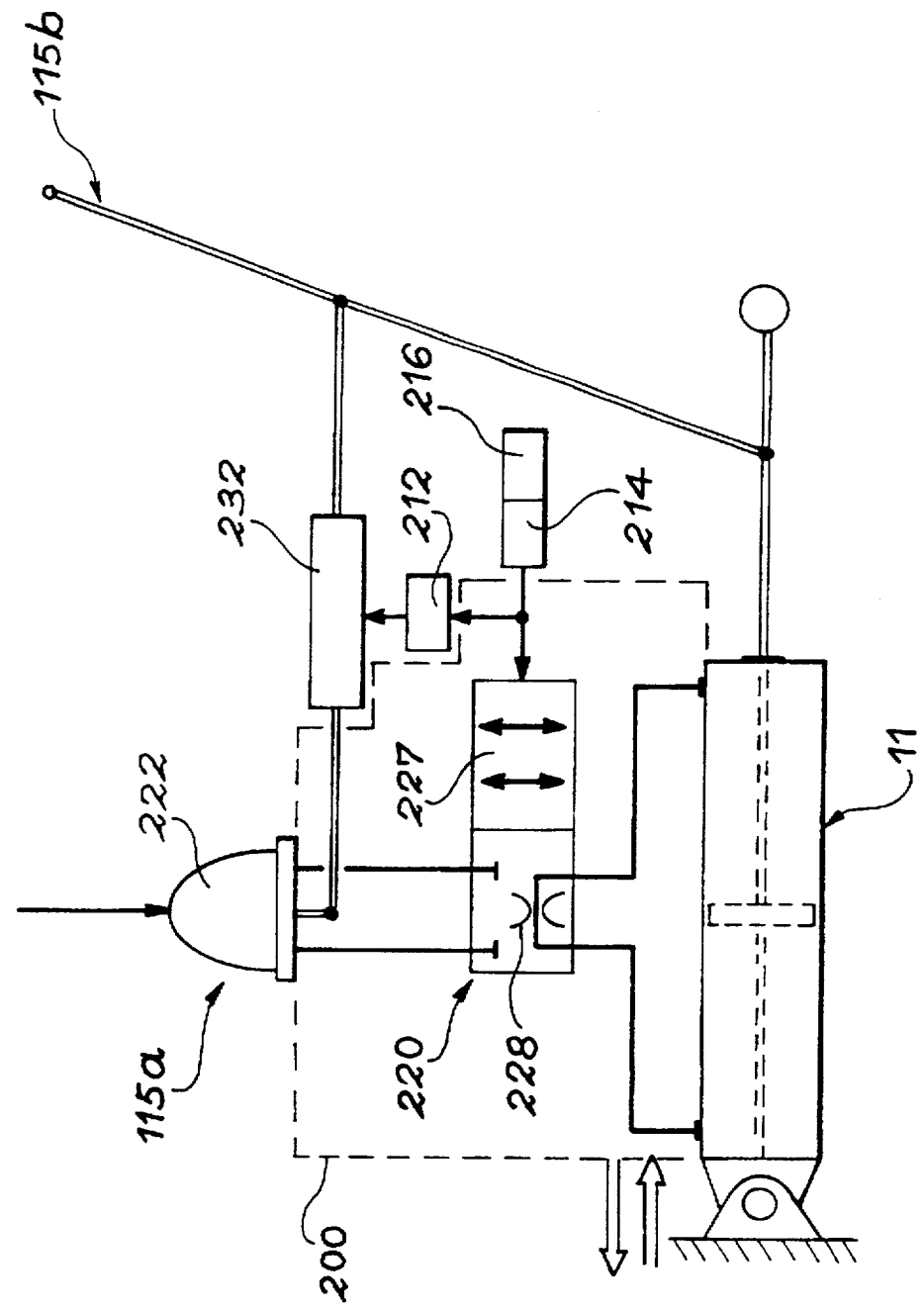
FIG. 5 is a simplified diagrammatic representation of another type of mixed servo-system for use in the device of FIG. 2.

FIG. 5 diagrammatically shows another type of mixed servo-system usable in the above-described device. The servo-system has a mode slide or slide valve 220 with only two positions. If at least one of the two solenoid valves 214 and 216, respectively controlled by the computing units 152 and 150 and visible in FIG. 2 is actuated, the mode slide is positioned in order to manually link the jack chambers 210, 211 via the restrictor 228 and the servo-system operates in the damped mode. The activation of the solenoid valve 212 also makes it possible to place the clutch 232 in a disengaged state, which makes the servovalve 222 independent of the mechanical control 115b.

When the solenoids 214 and 216 are deactivated, the mode slide 220 is positioned so as to link the chambers of jack 115 with the servovalve 222 across a double passage portion 227 of the slide. The servo-system is then able to operate either in the electrically active mode, or in the mechanically active mode.

The electrically active mode is activated if the solenoid valve 212 is activated. The mechanical control is then disengaged and immobilized and the electric control input 115a of the servovalve is controlled.

When the solenoid valve 212 is deactivated, either intentionally, or as a result of electrical failures as described above, the mechanical control is coupled to the servovalve via the clutch 232. The servovalve then supplies the chambers of the jack with a flow which is a function of the mechanical control input 115b, and which corresponds to the mechanically active mode.

In the envisaged application and by design, the servovalve is not simultaneously controlled by the mechanical control input and the electric control input.

Figure 6:
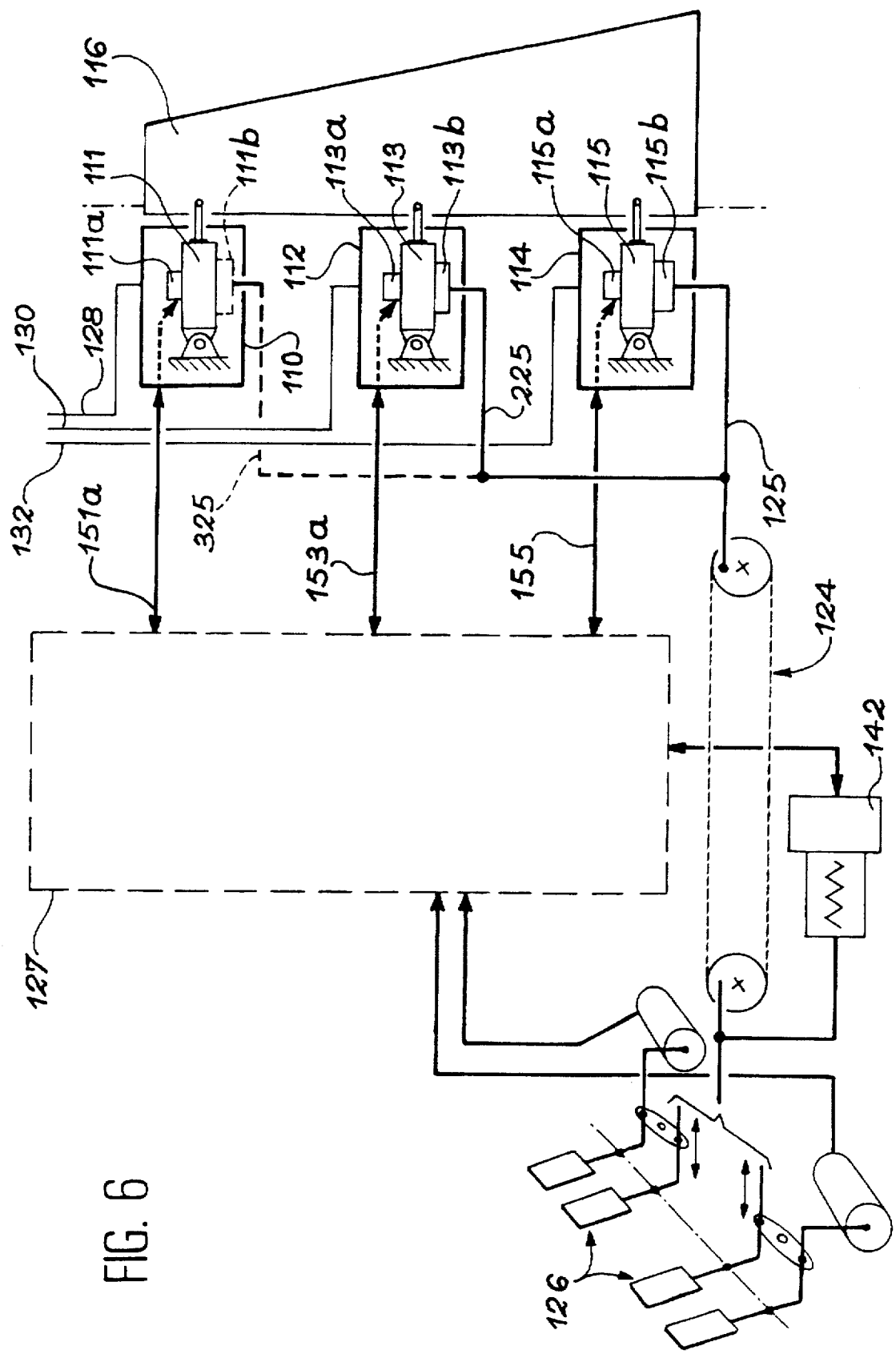
FIG. 6 is a simplified diagrammatic representation of a rudder control device according to a second embodiment of the invention.

FIG. 6 shows a variant in which the control device is equipped with two or three mixed servo-systems. As shown in FIG. 6, the servos-systems 110, 112 and 114 have electric control inputs 111a, 113a and 115a connected to the electric control unit 127, and also have mechanical control inputs 111b, 113b, 115b connected to the linkage 124 via transmissions 325, 225 and 125.

The redundant character of this configuration provides a supplementary operating security.

Figure 7:
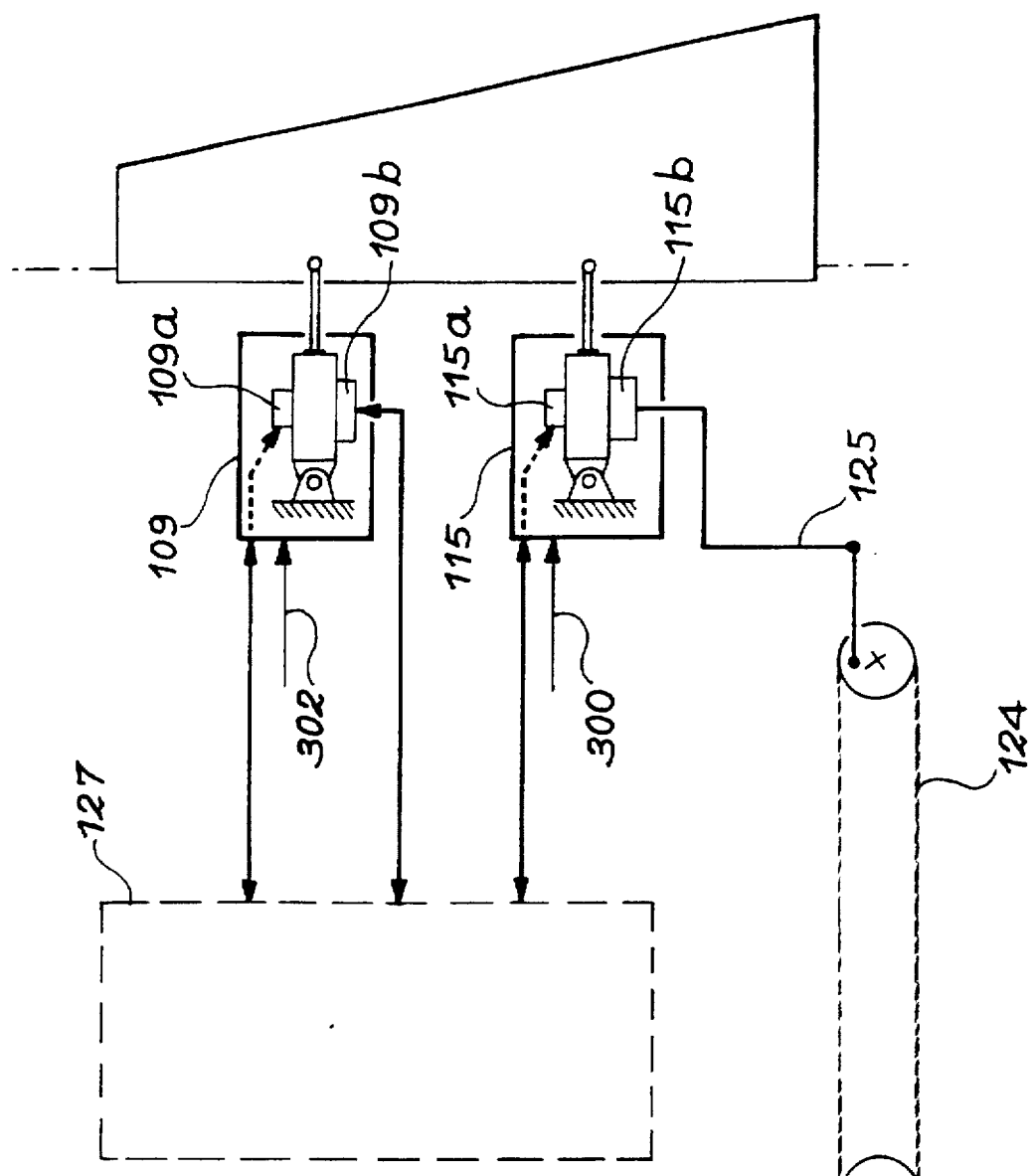
FIG. 7 is a simplified diagrammatic representation of a rudder control device according to a third embodiment of the invention.

FIG. 7 shows another variant wherein only two servo-systems are used. The device has a mixed servo-system 115 with an electric control input 115a connected to an electric control system 127, and a mechanical control input 115b connected to the pedals 126 by a linkage 124 and a transmission 125. The servo-system 115 is supplied by a hydraulic circuit 300 pressurized by two different engines of the aircraft.

The second servo-system is designated with the reference 109 and is an electrical back-up hydrostatic actuator or EBHA that has two electric inputs 109a, 109b connected to the control system 127.

The electric input 109a makes it possible to supply control commands to a servovalve (not shown) of the aforementioned type which is supplied by hydraulic circuit 302. The second electric input 109b supplies control commands to an integrated and autonomous hydraulic generating system for actuating the rudder.

In the case of a failure of one of the engines, the hydraulic circuit 300 remains pressurized by the second engine and the servo-system 115 remains operational. Moreover, in the case of a failure of an engine leading to a pressure loss on the hydraulic circuit 302, the servo-system 109 remains operational because its integrated, hydraulic generating system is then controlled via the input 109b.

Thus, these two servo-systems can operate the rudder in the case of a failure of one of the engines.

This embodiment economizes with respect to one servo-system and possibly a hydraulic circuit, compared with the embodiment of FIG. 2. Thus, a significant weight savings can be obtained.

We claim:

1. An aircraft rudder control device for controlling a rudder of an aircraft equipped with at least two engines, the control device comprising:

at least two servo-systems, each having at least one electric control input; and an electric control system for controlling the at least two servo-systems; wherein at least one of the at least two servo-systems is a mixed servo system having a mechanical control input, and the electric control system is able to occupy a) a first state corresponding to a normal operation of the engines, in which at least one of the servo-systems operates the rudder, b) a second state, corresponding to a failure of an engine, in which at least two of the at least two servo-systems simultaneously operate the rudder, and c) a third state corresponding to an electrical fault, in which the at least one mixed servo-system is controlled via its mechanical control input to operate the rudder.

2. The device of claim 1, wherein the electric control system comprises a plurality of computing units, and each computing unit is associated with one of the at least two servo-systems.

3. The device of claim 2, wherein each servo-system has a hydraulic jack with two chambers and a servovalve connected to a hydraulic circuit for supplying a hydraulic fluid flow to the chambers, and the hydraulic fluid flow is a function of an electrical command from the computing unit associated with the servo-system.

4. The device of claim 3, comprising three servo-systems each having an electric input, wherein at least one of the three servo-systems is a mixed servo-system.

5. The device of claim 4, wherein the at least one mixed servo-system comprises:

a first solenoid valve controlled by the computing unit associated with the at least one mixed servo system, wherein the first solenoid valve is able to occupy i) an activated state corresponding to an electrically active operating mode in which the chambers of the jack corresponding to the at least one mixed servo system are linked with the servovalve corresponding to the at least one mixed servo system, and ii) a deactivated state; and second and third solenoid valves respectively controlled by the computing units associated with the other two servo-systems; wherein each of the second and third solenoid valves can alternately occupy an activated state and a deactivated state;

when the first solenoid valve occupies the deactivated state and at least one of the second and third solenoid valves occupies the activated state, the chambers of the jack of the mixed servo-system are linked with one another in a damped operating mode; and when the first, second and third solenoid valves occupy the deactivated state, the chambers of the jack of the mixed servo-system are linked with a distributor connected to the mechanical input of the mixed servo-system in a mechanically active operating mode.

6. A device according to claim 1, wherein:

the mixed servo-system comprises first, second and third solenoid valves respectively controlled by a computing unit associated with the mixed servo-system and by computing units associated with the other two servo-systems;

each of the solenoid valves can alternately occupy an activated state and a deactivated state;

when at least one of the second and third solenoid valves is in the activated state, the servo-system operates in a damped mode, in which the jack chambers of the mixed servo system are mutually connected;

when the first solenoid valve is in the activated state and the second and third solenoid valves are in the deactivated state, the servo-system operates in an electrically active mode, in which the jack chambers of the mixed servo system are linked with the servovalve and in which the servo-system is controlled by the electric control input of the mixed servo system; and when the first, second and third solenoid valves are in the deactivated state, the servo-system operates in a mechanically active mode, in which the jack chambers of the mixed servo system are linked with the servovalve and in which the servo-system is controlled by the mechanical control input of the mixed servo system.

7. The device according to claim 3, wherein each hydraulic circuit has a pressurization system driven by at least one engine.

8. The device of claim 1, wherein at least one of the servo-systems comprises:

two electric control inputs;

a servovalve; and an integrated hydraulic generating system; wherein the servovalve is controlled by one of the two electric control inputs, and the integrated hydraulic generating system is controlled by the other of the two electric control inputs.

9. The device of claim 8, wherein:

at least one of the servo-systems is a mixed servo-system; and each of the at least one servo-system with two electric control inputs, and the at least one mixed servo-system is supplied by its own hydraulic circuit.

10. The device of claim 1, wherein:

one of the at least one electric control inputs of a first one of the servo-systems is connected to a first hydraulic circuit for operating the rudder during normal operation of the engines;

the first hydraulic circuit is associated with a first engine;

one of the at least one electric control inputs of a second one of the servo-systems is connected to a second hydraulic circuit;

the second hydraulic circuit is associated with a second engine;

one of the at least one electric control inputs of a third one of the servo-systems is a hydrostatic type and is connected to an integrated hydraulic generating system; and at least one of the first and second servo-systems is a mixed servo-system having a mechanical control input.

11. A method for controlling a rudder actuation system that actuates a rudder on an aircraft equipped with at least two engines, wherein the rudder actuation system comprises at least two servo-systems each having an electric control input, and an electric control system for controlling the servo-systems to actuate the rudder, and wherein at least one of the servo-systems is a mixed servo-system and has a mechanical control input, and the method comprises the steps of:

actuating the rudder during normal operation of the engines by controlling one of the at least two servo-systems via the corresponding electric control input;

actuating the rudder during abnormal operation of at least one of the engines by simultaneously controlling at least two of the at least two servo systems via the corresponding electric control inputs; and actuating the rudder when the electric control system has failed by mechanically controlling the at least one mixed servo-system.

12. A method for controlling a rudder actuation system that actuates a rudder on an aircraft equipped with at least two engines, wherein the rudder actuation system comprises at least two servo-systems for applying an actuating force on the rudder, each having an electric control input and a computing unit for controlling the servo-system to actuate the rudder, and wherein at least one of the servo-systems is a mixed servo-system and has a mechanical control input, the method comprising the steps of:

placing the mixed servo-system in a damping mode in response to an electric signal from at least one of the computing units of the other servo-systems;

placing the mixed servo-system in an electrically active mode in response to an electric signal from the computing unit of the mixed servo-system; and placing the mixed servo-system in a mechanically active mode in the absence of electric signals from the computing units of the servo systems.

* * * * *